(No Model.) 3 Sheets—Sheet 1.
A. F. RAMOS.
METHOD OF AND APPARATUS FOR DRYING COFFEE.
No. 563,801. Patented July 14, 1896.
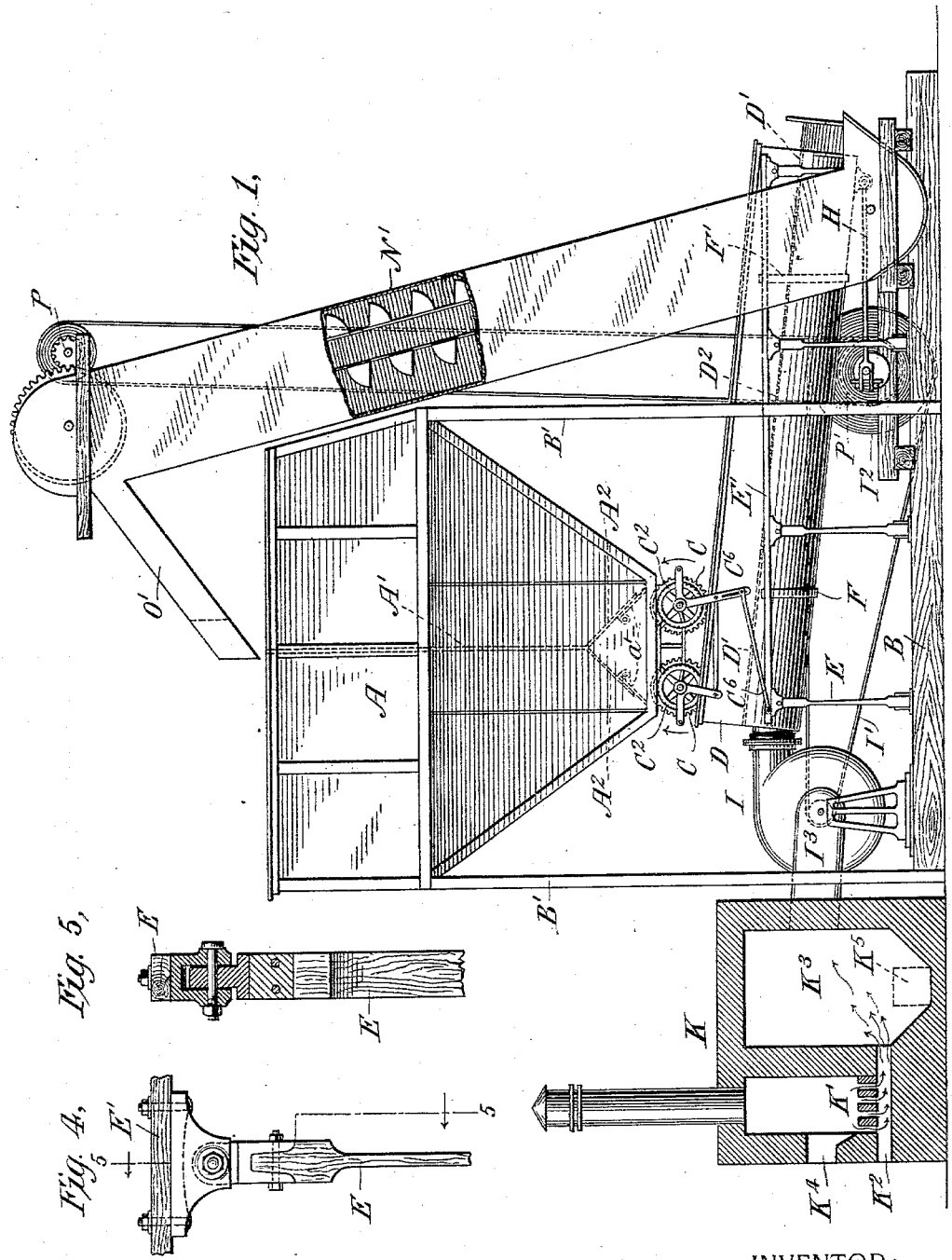
WITNESSES:
C. E. Ashley
H. W. Lloyd.
INVENTOR:
Augusto Ferreira Ramos
By his Attorneys
Baldwin, Davidson & Wight

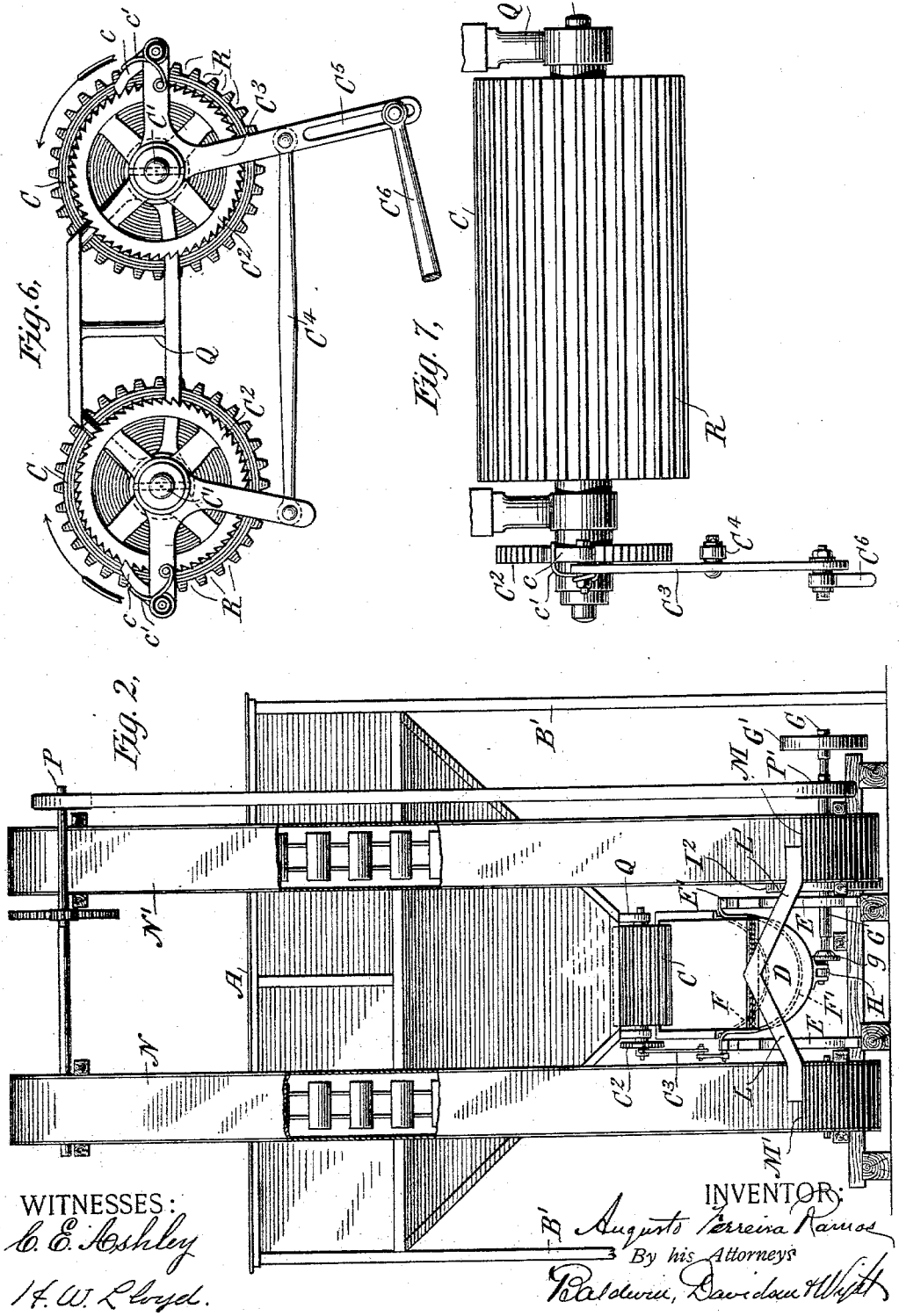

(No Model.) 3 Sheets—Sheet 3.
A. F. RAMOS.
METHOD OF AND APPARATUS FOR DRYING COFFEE.
No. 563,801. Patented July 14, 1896.
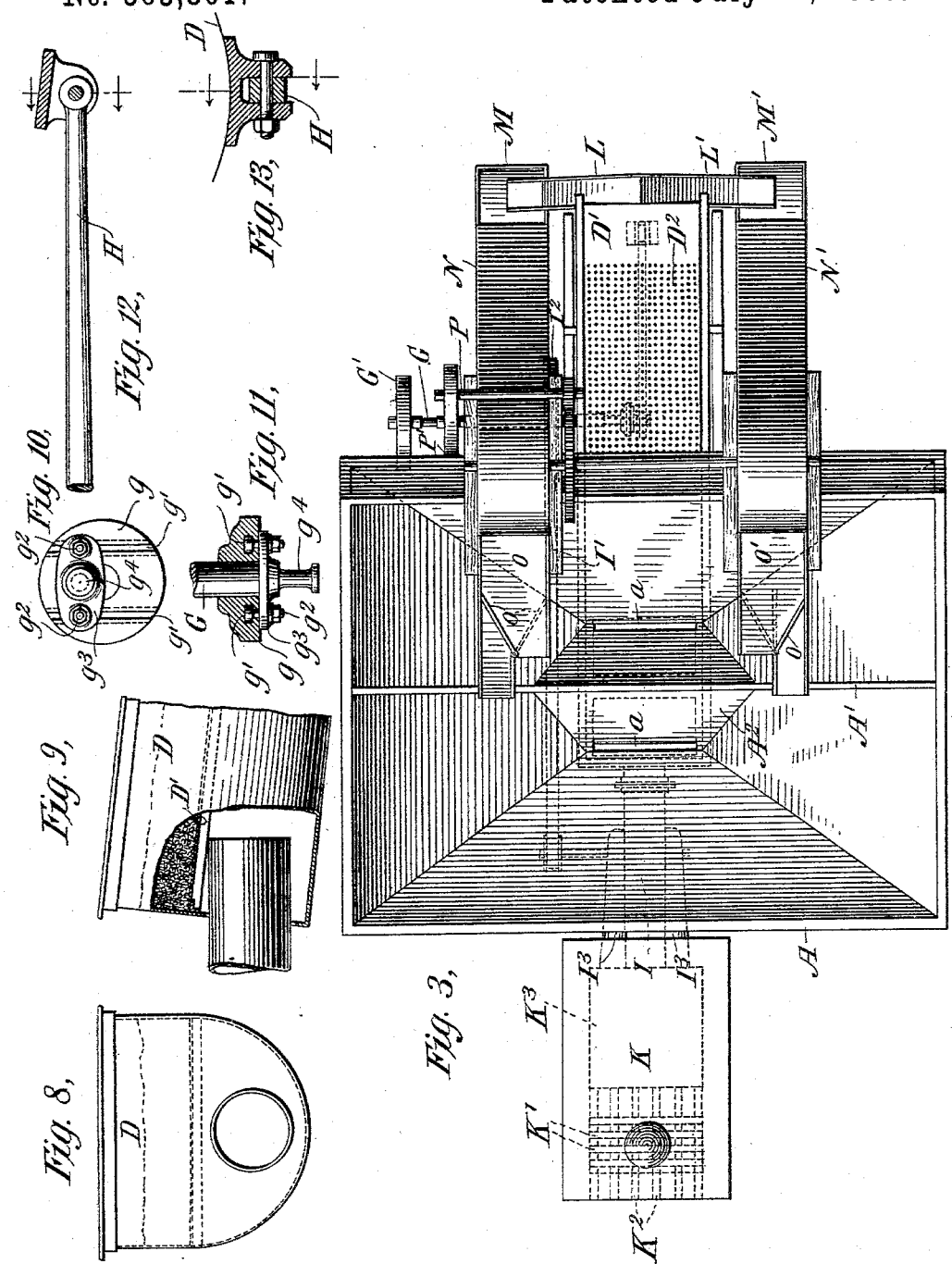
WITNESSES:
C. E. Ashley
H. W. Lloyd
INVENTOR:
Augusto Ferreira Ramos
By his Attorneys
Baldwin, Davidson & Wight

UNITED STATES PATENT OFFICE.

AUGUSTO FERREIRA RAMOS, OF ST. PAULO, BRAZIL, ASSIGNOR TO THE RAMOS DRYER COMPANY, OF SYRACUSE, NEW YORK.

METHOD OF AND APPARATUS FOR DRYING COFFEE.

SPECIFICATION forming part of Letters Patent No. 563,801, dated July 14, 1896.

Application filed January 7, 1896. Serial No. 574,592. (No model.)

*To all whom it may concern:*

Be it known that I, AUGUSTO FERREIRA RAMOS, a citizen of the Republic of Brazil, and a resident of St. Paulo, Brazil, have invented certain new and useful Improvements in the Methods of and Apparatus for Drying Coffee and other Materials, of which the following is a specification.

My invention is based primarily upon the fact that materials (as, for instance, coffee-berries) may be exposed for a brief interval of time to a very high temperature without roasting or injuring them; and I have found that the drying of the material to the desired extent may be accomplished by rapidly passing it through a relatively highly-heated zone or area, and then after the lapse of a suitable interval again passing it through such highly-heated area, this operation being repeated until the desired result has been obtained. I have also found in practice that in passing the coffee-berries through such highly-heated area and in such bulk or quantity as to give a large output to the machine some of the berries will become more highly heated than others, this being due either to the fact that some of the berries are more directly or for a greater length of time in such transit through the heated area exposed to the high temperature thereof than are other of the berries, or that the physical characteristics of the berries vary as regards the character of their pulp or the amount of moisture present to such extent that berries exposed to the same temperature for the same length of time will not be heated or retain the heat to the same degree. Having this fact in mind, I have further found that it is highly advantageous to accumulate the berries in bulk as they pass beyond the heated area, and allow them to rest in a suitable receptacle, during which period of rest there is a transference of temperature or equalization of temperature to such extent that practically the entire bulk, or rather the individual berries of such bulk, are brought to a substantially uniform temperature; and during this period of rest the berries part with more or less of their heat and give up more or less of the moisture carried by them. After such period of rest the berries are again caused to traverse the heated area, the operation described being repeated until the desired result is obtained. Such mode of operation therefore also constitutes a part of my invention. I have also found that during the transit of the berries through the highly-heated area it is desirable to keep them in agitation for the reason, among others, that they may be exposed relatively uniformly to the drying temperature, and shall be kept out of prolonged contact with the trough or chute through which they travel.

My invention therefore comprehends the agitation of the berries, or rather their movement transversely to their line of travel during their transit through the heated area.

My invention further contemplates certain improved organizations of instrumentalities hereinafter described in detail, whereby the method of operation above referred to may be carried out practically with high efficiency and facility.

I have found by extensive practical operation of my invention that coffee-berries may be desiccated to the desired degree, and that such desiccation proceeds with substantial uniformity from the exterior skin of the pulp to the beans or grains, and that the berries may be readily decorticated without injury to the grain; that such desiccation may be rapidly effected, and that the results obtained are equal, if not superior, to sun-dried berries.

As is well understood, coffee-berries from the plantation are usually washed before being dried, and are then decorticated, and the value of the product very greatly depends upon the proper drying and decortication. Heretofore the drying of the berries has usually been carried out on platforms, where the berries are spread out in layers and from time to time turned over by hand while exposed to the heat of the sun. Such tedious and expensive operation has, so far as I am aware, prior to my invention, given a commercial product superior to and of greater value than the product produced by drying-machines heretofore employed. By means of my invention the berries may be dried with more facility and economy than by the solar-heat method, and, as before stated, the product obtained is equal, if not superior, to that of sun-dried berries.

I have ascertained by practical experience in the commercial operation of my invention that coffee-berries may be exposed for a few seconds in a heated area having a temperature of about 500° or more centigrade. This figure is illustrative, however, as in the desiccation of coffee-berries it is not necessary to employ so high a temperature, but it is indicative of the marked destinction between my method of operation and the methods that have heretofore been employed. Of course the degree of heat and the time of exposure of the material to it, as well as the period of rest between exposures to such temperature, will depend upon the particular material being treated and will be varied to suit special conditions, not only in treating coffee-berries of different grades, but in treating the various materials to the drying of which my invention is applicable.

Heretofore, so far as I am aware, material to be dried has been subjected to a relatively low temperature during a relatively long period of time, that is to say, by causing it to traverse through a series of cylinders or along a series of pans, troughs, or belts while exposed to some drying medium, and where in such apparatus one traverse of the material therethrough has not been sufficient to afford the proper degree of desiccation the material has been again passed through the same apparatus; but even under such conditions, which are distinctively different from those existing in my method of operation, the material has not been allowed to accumulate and rest, nor has the purpose for which I so permit the material to accumulate and rest been indicated. I am aware, however, that material to be dried has during its passage through troughs been subjected to agitation and had imparted to it a motion transverse to its line of traverse, as, for instance, by imparting to the trough through which it traverses a compound motion, consisting of a reciprocal motion and a movement at right angles thereto.

My improved method of operation in detail and the details of organization of the apparatus, which I have devised as the best now known to me for the purpose of carrying out my invention, are hereinafter fully described.

In the accompanying drawings, Figure 1 is a side elevation with one of the elevator-casings partly broken away and a furnace in section; Fig. 2, an end elevation; Fig. 3, a plan view; Fig. 4, a detail elevation; and Fig. 5, a section therethrough on the line 5 5, showing a portion of the chute-supporting frame and one of the vertical resilient bars on which it is mounted; Fig. 6, a detail elevation showing the feed-rolls that take the coffee from the hopper and their actuating devices, and Fig. 7 a view of the same parts at right angles to Fig. 6; Fig. 8, an end view of the chute; Fig. 9, a side elevation of the upper or feed end of the chute partly broken away. Fig. 10 is a front view; Fig. 11, a sectional view illustrating the adjustable eccentric connection between the driving-shaft and pitman for imparting motion to the chute. Figs. 12 and 13 are detail views showing the connection of the pitman to the chute.

In constructing my apparatus as shown in the accompanying drawings, I support the hopper A upon a frame consisting of a bed-plate B and posts B'. The four walls of the hopper preferably converge, as indicated, and the hopper is divided transversely by a partition A', which near its lower end is bifurcated and forms the bottom walls $A^2 A^2$ to the tow compartments of the hopper. These walls terminate, as shown in Figs. 1 and 3, somewhat short of the bottom of the hopper, so as to leave elongated discharge-openings $a$, and on the under side of the inclined walls $A^2 A^2$ are hinged gates $a'$, operated in any convenient manner, and by the adjustment of which the width of the discharge-openings $a$ may be varied as desired. Suitably arranged beneath each opening $a$ is a toothed feed-cylinder C, whose construction and mode of operation will be hereinafter described. The higher end of a trough-shaped chute D is arranged beneath the feed-cylinders C C. This trough may be constructed, arranged, and mounted in the following manner: Two rows of posts or supports E are mounted upon the bed-plate and the supports of each series are respectively connected with horizontal side frame-bars E' by pivotal connections whose axes are at right angles to the side bars E', such connections being shown in detail on an enlarged scale in Figs. 4 and 5. The trough D is supported or swung upon these side bars by two curved straps F F', one of which, F', has a considerably deeper curve than the other, and consequently the trough is swung in an inclined position, that end farthest from the feed-cylinders being the lowest.

The driving-shaft G, mounted in suitable bearings and indicated plainly in Figs. 2 and 3, is provided with a pulley G' to be connected with a source of power. (Not shown.) The inner end of the driving-shaft G terminates beneath the trough-shaped chute D and approximately at the longitudinal center thereof. On the end of the shaft is attached the disk $g$, having two parallel dovetail grooves $g$ formed therein to receive the heads of bolts $g^2$, that screw to the disk a cross-piece $g^3$, provided with a wrist-pin $g^4$. A pitman H is connected with this wrist-pin, as indicated in Fig. 1, and its opposite end is connected with the under side of the chute D near the lower end thereof by a pivotal connection, as indicated in Figs. 12 and 13. As the driving-shaft G is revolved it will be obvious that there is imparted to the chute a compound motion, consisting of a to-and-fro motion and a vertical motion, due to the arcs described by the resilient supporting-posts E, and that the extent of this motion may be adjusted by the adjustment of the cross-piece $g^3$, carrying the wrist-pin $g^4$. The chute D is divided horizontally by a partition which is solid at each end, as indicated at D' D', and between such solid portions is perforated, as indicated at $D^2$.

A blower I is located in front of the higher end of the chute D and its discharge-pipe opens into the upper end of the chute D beneath the solid part D' of the horizontal partition thereof, the opening through which the discharge-pipe enters being of somewhat larger diameter than the discharge-pipe to allow of sufficient play at that point. This blower is driven by a belt I', which extends from a pulley on the shaft of the blower to a pulley $I^2$ on the driving-shaft. The inlets $I^3$ to the blower communicate with the chamber $K^3$ of the furnace K. The furnace illustrated is one of simple construction adapted to the operation of my system. It has two chambers K' $K^3$ and a grate or fireplace in the chamber K', of which $K^4$ is the door. Below the grate are parallel flues $K^2$, running at right angles to the grate-bars and upon the walls of which the grate-bars bear, so that the spaces between the bars open into the flues $K^2$, and through which the flames from the furnace are drawn by the draft of the blower I to heat the flues $K^2$, which conduct air into the chamber $K^3$. In this chamber are deposited the cinders and soot drawn in with the air and products of combustion, and which may be withdrawn through the door $K^5$. With certain kinds of fuel, which would not be detrimental to material being dried, the products of combustion may thus be delivered by the blower beneath the horizontal partition of the chute.

Of course other forms of furnace, many of which are thoroughly well known in the art, may be employed, and those styles may be used in which air could be heated to be supplied to the blower, in which event the products of combustion of the furnace would always pass off through the stack as usual.

The heated air or products of combustion delivered into the chute beneath its horizontal partition will pass up through the perforations in the partition and through the coffee or other material that may be passing down the chute on the partition, as hereinafter described. At the lower end the trough is provided with two discharge-spouts L L', which are arranged at right angles to deliver the material from the chute laterally. The spouts are inclined and the angle formed by the junction of their bottom faces is in the longitudinal center of the trough and in the plane of the partition thereof. The higher end of the chute D is closed by an end plate, as is also the lower end below the longitudinal partition. The spouts L L' deliver the material that has passed down the chute into the receptacles M M', from which it is delivered by endless conveyers N N' to corresponding spouts O O', which may be set so as to deliver the material into either compartment of the hopper A. The conveyers are driven as indicated from a shaft P, having a pulley thereon bolted to a pulley P' on the driving-shaft.

The feed-cylinders C C may be mounted and driven as follows: Any suitable frame, as Q, secured to and depending from the bottom of the hopper, carries the two feed-cylinders C C in suitable bearings, as will be well understood, the particular details of the construction of the frame being immaterial. The shaft C' of each feed-cylinder has fast thereon a ratchet-wheel $C^2$, and on the shaft outside of the ratchet-wheel is loosely mounted a bell-crank lever $C^3$, one arm of which is provided with a pivoted pawl $c$ and a spring $c'$, that presses the pawl into engagement with the ratchet. The other arms of the bell-crank lever are connected by a rod $C^4$, pivoted to them, so that motion imparted to one of the bell-crank levers will be correspondingly transferred to the other one. One of the arms $C^3$ of one of the bell-crank levers is elongated and provided with a slot $C^5$ for the adjustable attachment of the pitman $C^6$, pivoted upon one of the side frame-bars E' of the chute-supporting frame. As the motion hereinbefore described is imparted to the chute the feed-cylinders may be caused by the pawl-and-ratchet mechanism to revolve step by step toward each other, as indicated by the arrows in Fig. 6. The feed-cylinders are provided with longitudinal grooves or recesses R, as indicated, and their action and function are such that the coffee or other material discharged upon them through the openings $a$ in the bottom of the hopper are carried forward and dropped into the upper end of the chute upon the solid part D' of the horizontal partition thereof. By disengaging either of the pawls $c$ $c$ from its spring and throwing it back out of engagement with the ratchet-wheel, either of the feed-cylinders may be rendered inactive, while the other will continue to be advanced or rotated step by step. By adjustment of the gate-valves $o$ $o$ in discharge-spouts O O' of the conveyers the coffee or material raised by the two conveyers may be delivered into one compartment of the hopper A, and hence I may so conduct the operation that while material is being delivered into one hopper-compartment it is taken from the other and delivered to the chute D. Of course two conveyers, as indicated, are not essential. One may serve the purpose.

I make the ends D' D' of the horizontal partition of the chute solid in order to prevent the escape of the heated products of combustion or other heating medium at the feed end of the hopper, where the berries may not accumulate to such depth as they do in the central part of the chute, and at the discharge end for the same reason. I may supply the material to be dried in such quantity that it shall lie in approximately as thick a layer, relatively, as that indicated in Fig. 8; but this will of course be dependent upon particular circumstances and particular materials being treated. The perforations in the partition or screen are then sealed to an extent by the layer of berries, but the pressure produced by the blower will cause the heating medium to force its way up through the moving agitated layer of berries, and such pressure may be such as to assist in the agitation of the berries. It will be obvious that, owing to the compound motion imparted to the chute D, the coffee traveling downward over its horizontal partition will be thrown up and fall again repeatedly, and that this motion of the chute and behavior of the material will cause the rapid passage of the material through the chute to the lower end thereof. In fact, by properly regulating the angle of inclination of the chute and the extent and frequency of its motion the desired speed of traverse of the material through the chute may be obtained. The time of exposure of the berries to the heat will depend upon these considerations in connection with the width of the heated area.

As before stated, I have in practice exposed coffee-berries in a machine of the construction which I have described to a temperature of 500° centigrade, and in some cases the rate of reciprocation of the chute has been about one hundred and fifty per minute, and a period of the passage of the material over the perforated part of the plate has been approximately about fifteen seconds. As above stated, owing to this rapid traverse of the material through the heated zone, it is not injured by the very high temperature that may be employed, nor is it allowed to burn, scorch, or roast by reason of contact with the horizontal partition, since the compound motion of the trough at a suitable rate of speed as that just above mentioned prevents sufficiently-prolonged contact between any of the grains of the material and the partition, and practically in effect keeps the grains of material suspended during their rapid traverse of the heated zone.

After the material has been run through the chute it is delivered by the conveyer or elevator to a suitable receptacle, where it may rest for the purpose described. I prefer as a matter of practical work that such resting-chamber shall be one of the compartments of the hopper, and, as before stated, while the material is being delivered into one compartment it is being discharged to the chute from the other, and thus the cycle of operation may be continued until the material has been desiccated to the proper degree.

It will now be apparent that my invention has two distinguishing characteristic features, which are as follows:

First. That the invention, in part, consists in subjecting the coffee-berries for a very brief interval of time to such high temperature as would be destructive (i. e., a burning temperature) to them if they were exposed to it for a relatively longer interval of time, and that desiccation to the desired degree is accomplished by repeated exposures of the berries for such brief intervals of time to such relatively very high temperature.

Second. That the invention also comprehends exposing the berries for proper successive periods of time to a drying temperature, and between such periods of exposure allowing the berries to rest in bulk to permit of a transference of temperature between the individual berries and consequently an equalization of temperature of the mass of berries.

The operation of the mechanism which I have described and which is illustrated in the drawings is apparent from the foregoing, as are also the respective steps and details of my improved method of operation, and further or more specific description of either seems unnecessary.

With very juicy coffee-berries or cherry coffee it is desirable at the start to use a relatively low temperature—say 80° centigrade—because if the heat is too intense at the start there may be a tendency to the formation of a crust upon the berries that will prevent the heat from penetrating the pulp uniformly. In practice a temperature of 250° centigrade gives excellent results in treating coffee-berries.

When the treatment of the berries is completed, a trough or troughs may be placed under the spouts O O' of the elevators and the berries run into any suitable receptacles.

I claim as my invention—

1. The herein-described method of drying coffee-berries and other materials, which consists in exposing the berries to a relatively high temperature (i. e. a destructive or burning temperature) for such brief interval of time as to prevent destructive action thereon, accumulating the berries after they have been thus briefly exposed to such high temperature, allowing them to rest in bulk in order that there may be a transference of heat between the individual berries and an equalization of the heat in the mass, and then repeating such operations of brief exposure to high temperatures and resting in bulk to effect equalization of heat in the mass until the desired degree of uniform desiccation has been obtained.

2. In a drier, the combination of an inclined chute divided horizontally by a partition, and closed at each end below the partition, the partition being perforated in its central region and solid at each end, means for imparting to the chute a compound motion, consisting of a reciprocating movement and a movement transverse thereto, a furnace or heater, a blower connected therewith a connection from the blower, opening into the upper end of the chute beneath the solid part of the partition, and means for delivering the material to be dried upon the solid part of the partition at the upper end of the chute.

3. In a drier, the combination of an inclined chute divided horizontally by a partition, and closed at each end below the partition, the partition being perforated in its central region and solid at each end, means for imparting to the chute a compound motion, consisting of a reciprocating movement and a movement transverse thereto, a furnace or heater, a blower connected therewith a connection from the blower, opening into the upper end of the chute beneath the solid part of the partition, a hopper, and means for delivering material therefrom upon the solid part of the partition at the upper end of the chute, and an elevator or conveyer at the lower end of the chute for conveying the material back to the hopper.

4. In a drier, the combination of a furnace or heater, a blower, a chute divided longitudinally by a perforated partition, a hopper having two compartments, means for feeding material from either compartment to the upper end of the chute, and means at the lower end of the chute for receiving such material and delivering it to either compartment of the hopper.

5. In a drier, the combination of the chute having a perforated wall or bottom, means for causing a highly-heated medium to pass through such perforations, two receptacles for the material to be dried, means for feeding material from either receptacle to the upper end of the chute, and means for transferring the material from the lower end of the chute to either of said receptacles.

6. In a drier, the combination of the chute having a perforated wall or bottom, means for imparting to the chute a longitudinal reciprocatory movement and a movement transverse thereto, means for causing a highly-heated medium to pass through such perforations, two receptacles for the material to be dried, means for feeding material from either receptacle to the upper end of the chute, and means for transferring the material from the lower end of the chute to either of said receptacles.

7. In a drying apparatus, the combination of two hoppers or hopper-compartments, a chute or passage-way through which the material to be dried passes, means for passing the heated drying medium transversely through or across said chute or passage, feed devices for delivering the material from either hopper-compartment to one end of said chute or passage-way, and means at the other end thereof for returning the material to either of said compartments.

8. In a drying apparatus, the combination of a fixed hopper divided into two compartments, each having an opening, and feed devices at its bottom, a chute having a perforated bottom, two elevators adapted to receive the material and return it to the compartments of the hopper, a furnace for heating the air, a blower, a connection between the blower and the chute below the partition, and operating mechanism, substantially as set forth.

9. In a drying apparatus, a furnace having two compartments, a grate in one compartment, the spaces between the bars of which open into flues running at right angles to the bars, and open to the atmosphere at one end and into the other compartment at the other end, said last-named compartment being a depositing-chamber and having a door for the removal of deposited soot and cinders, a blower, and a connection between the blower and the upper region of the depositing-chamber.

10. In a drying apparatus, the combination of two hoppers or hopper-compartments, a heated passage-way through which the material to be dried passes, feed devices for delivering the material from either hopper-compartment to said passage-way, and means at the other end of the passage-way for returning the material to either of said compartments.

In testimony whereof I have hereunto subscribed my name.

AUGUSTO FERREIRA RAMOS.

Witnesses:
ANTONIO AUGT. RIES CORWEIN,
MANUEL EUSTAVIUS DA SILVEIRA.